United States Patent Office 3,269,995
Patented August 30, 1966

3,269,995
ISOTACTIC POLYMERS AND METHOD OF PRODUCING SAME
Kiyoshi Fujii, Kurashiki, Japan, assignor to Kurashiki Rayon Co., Ltd., Kurashiki-shi, Japan, a corporation of Japan
No Drawing. Continuation of application Ser. No. 118,498, June 21, 1961. This application July 8, 1964, Ser. No. 381,249
Claims priority, application Japan, May 27, 1961, 36/18,655
14 Claims. (Cl. 260—89.1)

This application is a continuation of my patent application Serial No. 118,498, filed June 21, 1961, now abandoned.

This invention relates to isotactic polyvinyl esters and isotactic polyvinyl alcohols derived therefrom, and to processes for making them.

It is an object of this invention to provide polyvinyl esters and polyvinyl alcohols which are characterized by being isotactic.

It is a further object of the invention to provide processes for producing isotactic polymers of the character indicated.

In accordance with the invention, isotactic polyvinyl esters are produced by acylation of a polyvinyl ether, using an organic acid anhydride and a Lewis acid. The resulting isotactic polyvinyl ester is then readily converted to an isotactic polyvinyl alcohol by conventional hydrolysis techniques. Polyvinyl alcohol is a polymer containing hydroxyl groups and corresponding to the formula:

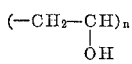

wherein $n$ is an integer which can vary within wide limits, as is well-known in the art. Polyvinyl alcohol can be produced from the corresponding polyvinyl ester, e.g. polyvinyl acetate, by alkaline or acid saponification or re-esterification, i.e. alcoholysis, in accordance with the following equation:

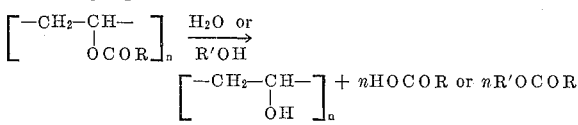

The foregoing reactions are referred to generally by the term "saponification" in accordance with conventional practice.

With respect to known saponification processes and techniques, reference is suitably made, for example, to Bristol U.S. Patent 2,700,035, Waugh et al. U.S. Patent 2,642,419 and Germain U.S. Patent 2,643,994.

It has been found that polymers of a vinyl ether can be converted, without destroying their tacticity, to polyvinyl esters by acylation using an anhydride of an organic acid, e.g. acetic anhydride, propyl anhydride, butyric anhydride, and the like, and a Lewis acid such as stannic chloride or zinc chloride.

Cleavage of ethers by means of acid anhydrides in the presence of Lewis acids results in the formation of the corresponding esters, depending on the anhydride used, and, for example, if a mixed ether is cleaved, benzyl and tertiary-butyl groups are split preferentially to secondary and primary groups. In accordance with this invention, this reaction is applied to polymers of vinyl ethers having a cleavable ether linkage in the side chain. Vinyl ethers suitably employed are vinyl tert-butyl ether and vinyl benzyl ether. The reaction is complete and the retention of the isotactic structure during the reaction is confirmed by X-ray examination of the product. Isotactic polyvinyl alcohols, which are produced in accordance with the methods of the present invention, by conventional saponification or hydrolysis of the polyvinyl ester produced, give a fiber diagram which resembles that of ordinary polyvinyl alcohol and the repeat distance along the fiber axis is 2.5 A. But when these polyvinyl alcohols are formylated, they give fiber patterns entirely different from those of ordinary syndiotactic polyvinyl formate, thus proving their isotactic structure. The identity period is 6.55 A., which shows the existence of three helicoidal units. Isotactic polyvinyl alcohols are characterized by their strong resistance to boiling water.

Many attempts to convert polyvinyl ethers to polyvinyl alcohols have heretofore been made, but in all cases replacement is not complete, and sometimes the finished polymer contains foreign groups because of the higher reactivity of the hydroxyl groups.

An important advantage of the present invention is the elimination of side reactions. As will be seen from the reaction mechanism,

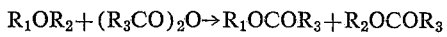

the introduction of foreign groups other than ester groups does not occur and the results of actual reaction confirm this to be so.

Another advantage of the present invention is that the reaction proceeds effectively in a homogeneous system. Sometimes the polymer is salted out as a gel on addition of the catalyst, but by repeating the reaction, full completion of the replacement can be achieved.

The invention will be further understood from the following specific examples of practical application. However, it will be understood that these examples are for purposes of illustration only and are not to be construed as limiting the scope of the present invention in any manner.

*Example 1*

To 10 ml. of vinyl tert-butyl ether, 40 ml. of n-hexane were added and the mixture was maintained at −78° C. To this mixture were added 10 drops of boron trifluoride etherate. After 2 hours, the mixture was added to a methanol-water mixture containing caustic alkali to quench the catalyst and precipitate the polymer. The polyvinyl tert-butyl ether thus obtained was dissolved in benzene and precipitated with methanol. The polymer was reprecipitated three additional times and was finally dried to constant weight. The yield was 7.7 g. The intrinsic viscosity of the polymer in benzene was about 0.184 (l./gr.) at 30° C.

Two grams of the polymer in 10 ml. of acetic anhydride and 20 ml. of benzene were treated with 0.8 gr. of zinc chloride in 5 ml. of acetic anhydride and 10 ml. of benzene at room temperature. Instantly the mixture turned dark green and gelified. The mixture was dissolved in benzene and precipitated with n-hexane. The polymer was reprecipitated three additional times and was then dried to constant weight.

The dried polymer was dissolved in 20 ml. of benzene and 10 ml. of acetic anhydride. To this solution, 0.8 gr. of stannic chloride in 5 ml. of benzene and 5 ml. of acetic anhydride were added at room temperature. After 5 minutes, the reaction mixture was added to n-hexane and the precipitated polymer was dissolved in methanol and precipitated with water. After three reprecipitations, the polymer was dried, and weighed 1.4 g.

This polymer was dissolved in 28 ml. of methanol, and to this solution were added 14 ml. of a 1 N soltuion of caustic soda containing hydrous methanol, to effect saponification of the polymer, at 40° C.

The infrared spectrum of the resulting white polymer agreed well with that of ordinary polyvinyl alcohol, and the X-ray fiber diagram of the polymer also agreed well with that of ordinary polyvinyl alcohol, the repeat distance along the fiber axis being 2.5 A.

This polyvinyl alcohol was then 100% formylated in anhydrous formic acid using monochloroacetic acid as a catalyst. Unlike ordinary polyvinyl formate, the thus-produced formylated polymer was found to be insoluble in hot acetonitrile and dimethylformamide. This polymer gave a sharp X-ray diagram, the identity period being 6.55 A. It was isotactic and exhibited high resistance to boiling water, unlike ordinary polyvinyl alcohol.

*Example 2*

The polyvinyl tert-butyl ether used in Example 1 (2 gr.) was dissolved in 30 ml. of benzene and 5 ml. of acetic anhydride. To this mixture, 2 gr. of stannic chloride in 10 ml. of benzene and 2 ml. of acetic anhydride were added. After 5 minutes, the polymer was recovered as in Example 1.

The finished polymer was substantially free of color, and 98% of the ether groups had been removed and their replacement with acyl groups was almost complete. On infrared analysis a small amount of hydroxyl groups was observed. This polyvinyl alcohol exhibited the characteristics observed in the polymer produced in Example 1.

*Example 3*

There were dissolved 10 ml. of vinyl tert-butyl ether in 30 ml. of toluene and the mixture was kept at −78° C. To this mixture, 0.023 ml. of aluminum diethyl chloride in 10 ml. of toluene was added under nitrogen. After 18 hours reaction at −78° C., the reaction mixture was added to methanol. The yield of polymers was 1.1 gr. and the polymer thus obtained was treated as in Example 1, and there was produced an isotactic polyvinyl ester, and an isotactic polyvinyl alcohol characterized by high resistance to boiling water.

*Example 4*

Ten ml. of vinyl benzyl ether were dissolved in 16 ml. of chloroform and 20 ml. of n-hexane and the mixture was maintained at −60° C. To this mixture, 20 drops of boron trifluoride etherate were added. After 2 hours polymerization, 4.2 gr. of polyvinyl benzyl ether were obtained. To 2 gr. of this polyvinyl benzyl ether in 20 ml. of toluene and 10 ml. of acetic anhydride, 1.98 gr. of stannic chloride were added dropwise at room temperature. Upon the addition of the stannic chloride, the temperature rose and the reaction mixture turned to a dark brownish color.

After 5 minutes, the reaction mixture was added to petroleum ether and the polymer precipitated. The polymer was dissolved in a methanol-acetone mixture and was then precipitated with water. The polymer was reprecipitated with water and the polymer was then reprecipitated three additional times and finally dried to constant weight. The yield was 1.2 gr. Infrared spectrum and elementary analysis showed that the polymer obtained was polyvinyl acetate and that it was isotactic. Following the procedure described in Example 1, it was readily convertible to an isotactic polyvinyl alcohol.

The conditions and the relative relationships set forth in the examples are those preferred in carrying out the process of this invention, but it will be understood that other conditions and relationships may be used within the scope of the invention. In general, unless otherwise indicated, conventional operations and techniques are suitably employed in forming the polymers of this invention.

Thus, the treatment with the organic anhydride and with the Lewis acid is readily carried out at room temperature although higher temperatures may be employed if desired. The anhydrides are preferably those of lower alkyl carboxylic acids but other organic anhydrides effective to form polyvinyl esters from polyvinyl ethers which are convertible by conventional saponification are also suitably used. The conversion of the polyvinyl ether to the polyvinyl ester is most advantageously carried out in a solvent for the polyvinyl ether being treated. An aromatic hydrocarbon such as benzene and toluene is preferred for this purpose but other solvents which do not react with the polyvinyl ether and which dissolve it are suitably used.

The crystalline or isotactic polyvinyl ether which is employed is made by any convenient known means from the corresponding vinyl ether monomer.

In general, good results are achieved by effecting polymerization of the vinyl ether at low temperatures, e.g. −60 to −80° C. in a hydrocarbon solvent with a Lewis acid or a Lewis acid addition complex or alkyl, such as the boron trifluoride etherate or the aluminum diethyl chloride used in the examples, preferably in the presence of chloroform.

Lewis acids are, of course, a well-known class of compounds characterized by the late Gilbert N. Lewis as electron acceptors. Typical examples of Lewis acids useful in relation to the present invention are boron trifluoride, aluminum chloride, aluminum bromide, stannous chloride, stannic chloride, zinc chloride, titanium tetrachloride, zirconium tetrafluoride, and like inorganic halides, halo-organic acids such as trichloroacetic acid, trifluoroacetic acid, and the like. The complexes of these Lewis acids which are also effective are exemplified by the coordination compounds with lower alkyl (1 to 4 carbon atoms) alcohols such as methanol, ethanol, and butanol, lower alkyl ethers such as diethyl ether, methylethyl ether, dibutyl ether, and propylbutyl ether, cyclic saturated ethers containing up to six carbon atoms, such as tetrahydrofuran, and the like.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

I claim:

1. Isotactic polyvinyl esters of lower alkyl carboxylic acids convertible by saponification to isotactic polyvinyl alcohol where said isotactic polyvinyl alcohol has a high resistance to boiling water, said isotactic polyvinyl alcohol being convertible to polyvinyl formate where said polyvinyl formate is insoluble in hot acetonitrile and dimethylformamide, and where said polyvinyl formate has an identity period of 6.55 A. as shown by its X-ray diagram.

2. Isotactic polyvinyl alcohol having a high resistance to boiling water, said isotactic polyvinyl alcohol being convertible to polyvinyl formate where said polyvinyl formate is insoluble in hot acetonitrile and dimethylformamide, and where said polyvinyl formate has an identity period of 6.55 A. as shown by its X-ray diagram.

3. A process of producing an isotactic polyvinyl ester of a lower alkyl carboxylic acid which comprises reacting a polyvinyl hydrocarbon ether having an isotactic structure with an anhydride of a lower alkyl monocarboxylic acid in the presence of a Lewis acid catalyst.

4. A process of producing isotactic polyvinyl acetate which comprises reacting polyvinyl tert-butyl ether having an isotactic structure with acetic anhydride in the presence of a Lewis acid catalyst.

5. A process of producing isotactic polyvinyl alcohol which comprises preparing an isotactic polyvinyl ester of a lower alkyl carboxylic acid by reacting a polyvinyl hydrocarbon ether having an isotactic structure with an anhydride of a lower alkyl monocarboxylic acid in the presence of a Lewis acid catalyst, and saponifying said prepared isotactic polyvinyl ester to produce said isotactic polyvinyl alcohol.

6. A process of producing isotactic polyvinyl alcohol which comprises preparing isotactic polyvinyl acetate by reacting a polyvinyl hydrocarbon ether having an isotactic structure with acetic anhydride in the presence of a Lewis acid catalyst, and saponifying said prepared isotactic polyvinyl acetate to produce said isotactic polyvinyl alcohol.

7. A process of producing isotactic polyvinyl alcohol which comprises preparing isotactic polyvinyl acetate by reacting polyvinyl tert-butyl ether having an isotactic structure with acetic anhydride in the presence of a Lewis acid catalyst, and saponifying said prepared isotactic polyvinyl acetate to produce isotactic polyvinyl alcohol.

8. A process of producing an isotactic polyvinyl ester of a lower alkyl carboxylic acid, which comprises reacting a compound selected from the group consisting of polyvinyl lower alkyl ethers having an isotactic structure and polyvinyl aralkyl ethers having an isotactic structure with an anhydride of a lower alkyl monocarboxylic acid in the presence of a Lewis acid catalyst.

9. A process of producing isotactic polyvinyl alcohol which comprises preparing an isotactic polyvinyl ester of a lower alkyl carboxylic acid by reacting a compound selected from the group consisting of polyvinyl lower alkyl ethers having an isotactic structure and polyvinyl aralkyl ethers having an isotactic structure with an anhydride of a lower alkyl monocarboxylic acid in the presence of a Lewis acid catalyst, and saponifying said prepared isotactic polyvinyl ester to produce said isotactic polyvinyl alcohol.

10. The process of claim 3 wherein the polyvinyl hydrocarbon ether is a polyvinyl $C_4$–$C_7$ ether.

11. The process of claim 3 wherein the polyvinyl hydrocarbon ether is a polyvinyl lower alkyl ether.

12. The process of claim 5 wherein the polyvinyl hydrocarbon ether is a polyvinyl $C_4$–$C_7$ ether.

13. The process of claim 6 wherein the polyvinyl hydrocarbon ether is a polyvinyl $C_4$–$C_7$ ether.

14. The process of claim 5 wherein the polyvinyl hydrocarbon ether is a polyvinyl lower alkyl ether.

References Cited by the Examiner
FOREIGN PATENTS
819,291   9/1959   Great Britain.

JOSEPH L. SCHOFER, *Primary Examiner.*
J. F. McNALLY, *Assistant Examiner.*